Oct. 24, 1950 — W. B. WOODRING — 2,526,789
DRY CELL
Filed March 22, 1946
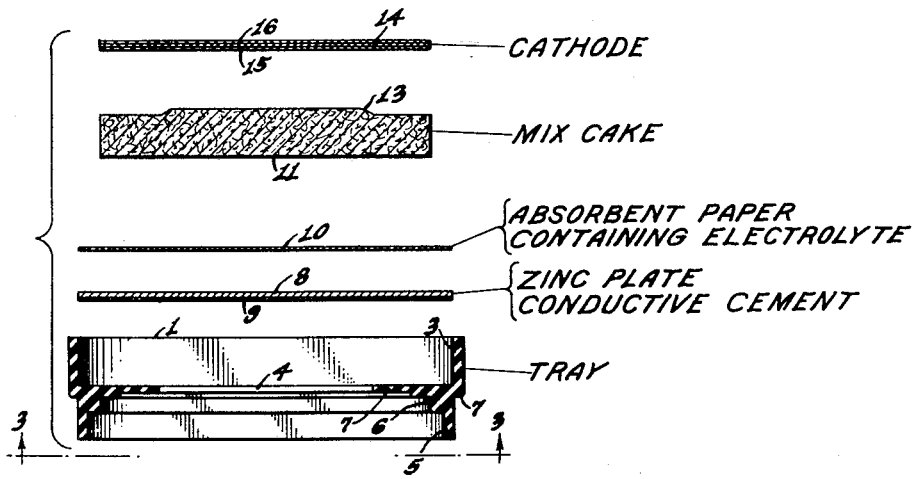
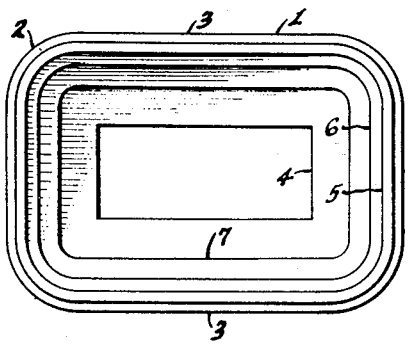
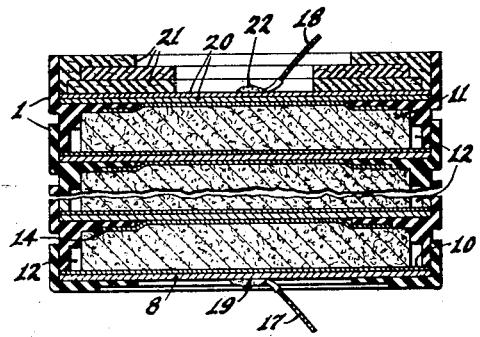
INVENTOR
William B. Woodring
BY Pennie, Edmonds, Morton & Barrows
ATTORNEY Patented Oct. 24, 1950

2,526,789

UNITED STATES PATENT OFFICE 2,526,789

DRY CELL

William B. Woodring, West Haven, Conn., assignor to Olin Industries, Inc., New Haven, Conn., a corporation of Delaware Application March 22, 1946, Serial No. 656,205

6 Claims. (Cl. 136—111)

This invention relates to primary batteries and more particularly to batteries of the "flat type" consisting of a number of cells formed of flat elements.

In the earlier types of flat battery, the flat elements were arranged in proper order to produce a battery of the desired number of cells and then wrapped with tapes or the like, while under compression, to keep the elements in intimate contact with each other. Instead of wrapping the assembly with tapes, it was sometimes placed in a container and suitable wedges arranged in the space between the ends of the battery and the inside walls of the container to place them under compression. In either instance, the battery after being placed in the container, and while under compression, was surrounded by a suitable plastic material which was poured into the container, while in liquid or semi-liquid form, to fill the voids and then solidify, to retain the electrolyte in place.

Another type of flat battery consists of separate groups of flat elements, which may or may not form complete cells, but in which the peripheral margin of certain groups of elements, are covered with an integument to insulate the electrolyte in the respective cells, and the entire battery held in compression by binding tapes or the walls of the container in which it is confined. In these constructions the groups of elements are incapable of maintaining the desired pressure for purposes of electric contact without additional means, such as the aforesaid tapes or container wall.

In a copending application Serial No. 654,904, filed March 16, 1946, now Patent No. 2,521,800, there is disclosed and claimed a battery formed of flat cell elements in which groups of elements are contained in trays, each of which has a flange depending from the bottom, which flange is of a size to be snugly received within the side walls of the next adjacent tray so that a plurality of such trays containing cell elements can be assembled to form a battery of a plurality of cells and the cells are retained in assembled relation without the use of other securing or fastening means.

The present invention comprises a battery consisting of a plurality of cell elements mounted in trays in which the cathode of one cell and the anode of the adjacent cell are secured to each other by a conductive cement to produce a battery having improved performance characteristics. When a number of cells are assembled in a battery of this type a portion of the bottom of each tray is open to permit contact between the elements in the adjacent trays. It is therefore necessary for either the cathode or the anode to be offset a distance equal to the thickness of the bottom of the tray to insure contact between them. This can be done by offsetting a portion of the anode or cathode or by offsetting each of them so that the total amount of offset is equal to the thickness of the bottom of the tray. The portions of the cathode and anode in alignment with the opening in the bottom of the tray when brought in contact with each other in this manner and cemented to each other provide a better intercell connection than in any of the flat type batteries of this general character heretofore proposed.

In the present invention I employ a zinc plate as an anode coated on one surface with a layer of a conductive cement. This conductive cement not only serves as a seal on those portions of the anode which are in contact with the tray and thereby eliminates the necessity of coating the tray, but it also serves as a means for physically and electrically connecting the anode of one cell to the cathode of the next adjacent cell. Similarly as a cathode I may employ a sheet of cloth or other flexible material or metal which may be shaped to extend through the opening in the bottom of the tray and I coat the surface of this cloth adjacent the anode with a similar coating of conductive cement. The cloth is impregnated with carbon paint or the like which serves as the cathode. When the cell elements are assembled in the tray and the assembly heated, while under compression, the layers of conductive cement between the cathode and anode of the cell are sealed to each other and to the tray. This connection between the electrodes of adjacent cells materially reduces internal resistance of the battery and also provides a more permanent connection than would otherwise be the case. Further, the passage of electrolyte around the anode or cathode is prevented.

In the accompanying drawings I have shown one form of the invention. In this showing:

Fig. 1 is a vertical, sectional view of the elements of a cell and of the tray with the parts separated for clarity of presentation;

Fig. 2 is a similar view of a battery formed of a plurality of cells of the type shown in Fig. 1; and Fig. 3 is a bottom plan view of one of the trays.

Referring to the drawings, the reference numeral 1 designates generally a tray which may be made of any suitable shape but which as shown is substantially rectangular in horizontal cross-section with rounded corners 2. This tray may be made of any dielectric material but is preferably formed of a material that is thermoplastic to permit sealing of a plurality of trays containing cell elements to each other to form a battery of a plurality of cells. Any of the thermoplastic synthetic resins or other thermoplastic materials may be employed in manufacturing the tray. I may thus employ vinyl resins, various cellulose compounds and other materials possessing the desired dielectric properties and also possessing thermoplastic properties. The tray is preferably made of sufficient thickness to be substantially rigid and to give sufficient strength to the assembly to eliminate the necessity of an outer casing. The various materials which I contemplate using in the manufacture of the tray readily lend themselves to molding operations and the trays are preferably made in this way but of course they can be made in any other way. The tray is substantially in the form of a shallow cup having substantially straight side walls 3 and having an opening 4 of substantial size in the bottom of the tray. Depending downwardly from the bottom of the tray I provide a flange 5. This flange is spaced inwardly a distance equal to the thickness of the side wall of the tray so that each flange will be snugly received within the side wall of the next adjacent tray when a plurality of the trays are assembled as shown in Fig. 2 of the drawing. The upper portion of the flange is of greater thickness than the lower portion, as indicated at 6, and the lower face of the bottom of the tray is provided with a recess 7.

Within the tray I first place a zinc plate 8 which is of substantially the same area as the tray and which forms the anode. This plate is coated with a conductive cement 9, the coating being shown exaggerated in Fig. 1 for the purpose of illustration. The coating may consist of a mixture of a conductive pigment, such as graphite or acetylene black or a mixture of the two, dispersed in any suitable solvent, such as a mixture of methyl ketone and toluene, and containing a thermoplastic cement admixed therewith. The cement may be any of the electrically conductive rubber compositions formed of natural rubber or synthetic elastomers such as the product sold by Minnesota Mining & Manufacturing Company and known as EC #826. As shown, the cathode consists of a strip 14 of cloth or other flexible material impregnated with a carbon paint 15 which forms the cathode. This composition consists of an elastomer mixed with a conductive paint, such as graphite or acetylene black, or a mixture of the two. It is first dispersed in a suitable solvent, such as a mixture of methyl ketone and toluene, to a consistency which will readily spread and penetrate the interstices of the fabric. The elastomer may be vinyl chloride-acetate copolymer or polyvinyl butyral compositions of the thermoplastic or thermosetting variety or copolymers of vinylidene chloride with vinyl chloride. A coating 16, similar to the coating 9, is applied to the opposite surface of the cloth and serves to secure the cathode of one cell to the anode of another cell when the cells are assembled. The electrodes are sealed to the upper and lower sides of the bottom of the tray by a heated punch. Either of the electrodes is deformed by an embossed portion on the end of the punch causing the electrodes to be sealed firmly together through the opening in the tray. Thus the cathode is shown deformed in Fig. 2 of the drawing, but either the anode or the cathode or both may be so deformed to bring them into contact with each other through the opening 4. An absorbent sheet 10 of blotting paper or other fibrous material serving as a separator is arranged on top of the zinc plate. The separator is preferably provided with a coating of paste on the side adjacent the anode and carries the usual electrolyte A mix cake 11 is arranged on top of the separator, the mix cake consisting of a pressed cake of the usual depolarizing mix used in dry cells. It may thus consist of a mixture of powdered carbon and manganese dioxide with a suitable binder to retain the components in a cake form. The mix cake is slightly smaller in area than the area of the tray and when a number of the trays are assembled to form a battery, the inner side of the portion 6 of the flange engages the sides of the mix cake to properly position and center it as shown in Fig. 2. This provides an air space 12 in each cell. In Fig. 1 of the drawing the mix cake is shown having a central section 13 of increased height to extend through the opening 4 in the bottom of the adjacent tray. In practice the mix cake originally is of uniform height throughout, but is shaped as shown in Fig. 1 after it is placed in the cell and compressed with the other cell elements.

In constructing a battery, trays into which anodes and cathodes have been mounted, as heretofore described, are filled with separators and mix cakes and the trays then stacked as shown in Fig. 2. The stack is placed under compression to bring the elements into intimate contact with each other and while under pressure, the assembly is dipped into a solvent for the material of the trays, removed, drained and allowed to dry. This operation cements the outer wall of the flange 5 of one tray to the inner side of the wall 3 of the adjacent tray causing them to adhere to each other. By the pressure applied the mix cake is also shaped to provide the projection 13 and cause it to extend into the embossed portion of the anode or cathode as the case may be.

When a number of cells are connected to form a battery, suitable leads 17 and 18 are connected to the bottom and the top of the battery. The lead 17 is connected directly to the zinc plate in any suitable manner as by soldering as indicated at 19. It is not advisable to directly expose the cloth cathode of the upper cell and I preferably place several metal plates 20 over it and retain these plates in position by fusible material 21, such as pitch or the like. The lead 18 is soldered or otherwise connected to the outer one of these plates, as indicated at 22. The upper assembly is held in place by the bottom and flange of a tray from which the side walls are removed.

I claim:

1. A battery comprising a plurality of cells, each cell comprising a rigid tray having an opening in the bottom thereof and a plurality of cell elements in the tray, the anode of each cell being arranged in the bottom of the tray and being provided with a coating of conductive cement, the cathode of each cell being arranged adjacent the top of the tray and contacting with the anode of the adjacent cell through the opening in the bottom of the adjacent tray, the cathode being formed of a sheet of fabric impregnated with and having a coating of carbon paint on one side and a coating of conductive cement on the other side, the coating of the cathode of one cell being sealed to the coating of the anode of the adjacent cell.

2. A dry battery element comprising a tray having an open top and having an opening in the bottom, a flange depending from the bottom of the tray, an anode arranged in the tray, the anode having a coating of conductive cement on its lower surface, a cathode arranged beneath the bottom of the tray within the flange, and a coating of conductive cement on the upper surface of the cathode, said coatings being sealed to the upper and lower surfaces of the bottom of the tray and being sealed to each other at the opening.

3. A dry battery element comprising a tray having an open top and having an opening in the bottom, a flange depending from the bottom of the tray, an anode arranged in the tray, the anode having a coating of conductive cement on its lower surface, a flexible cathode arranged beneath the bottom of the tray within the flange, and a coating of conductive cement on the upper surface of the cathode, said coatings being sealed to the upper and lower surfaces of the bottom of the tray and being sealed to each other at the opening.

4. A dry battery element comprising a tray having an open top and having an opening in the bottom, a flange depending from the bottom of the tray, an anode arranged in the tray, the anode having a coating of conductive cement on its lower surface, a cathode comprising a sheet of cloth arranged beneath the bottom of the tray within the flange and a coating of conductive cement on the upper surface of the cathode, said coatings being sealed to the upper and lower surfaces of the bottom of the tray and being sealed to each other at the opening.

5. A dry battery element comprising a container of dielectric material having side walls and an open bottom, an anode arranged on one side of the bottom and a cathode arranged on the opposite side of the bottom, a coating of conductive cement on one surface of the anode, said coating being sealed to the bottom of the container and to the cathode at said opening.

6. A battery comprising a plurality of cells, each cell comprising a container of dielectric material having side walls and an open bottom, an anode arranged on one side of the bottom and a cathode arranged on the opposite side of the bottom, a coating of conductive cement on one surface of the anode, said coating being sealed to the bottom of the container and to the cathode at said opening, and means for retaining a plurality of said elements assembled to form a battery.

WILLIAM B. WOODRING.

REFERENCES CITED

The following references are of record in the file of this patent:

UNITED STATES PATENTS

| Number | Name | Date |
| --- | --- | --- |
| 1,613,586 | Dam | Jan. 4, 1927 |
| 2,272,969 | French | Feb. 10, 1942 |
| 2,375,875 | Sanderson | May 15, 1945 |
| 2,416,576 | Franz et al. | Feb. 25, 1947 |

FOREIGN PATENTS

| Number | Country | Date |
| --- | --- | --- |
| 269,977 | Great Britain | Apr. 27, 1927 |
| 558,207 | Great Britain | Dec. 24, 1943 |